(12) United States Patent  
Mouchet (10) Patent No.: US 10,675,926 B2  
(45) Date of Patent: Jun. 9, 2020

(54) HIGH VOLUME VEHICLE INSPECTION SYSTEM AND METHODS

(71) Applicant: ATEQ Corporation, Livonia, MI (US)

(72) Inventor: Jacques Mouchet, Shanghai (CN)

(73) Assignee: ATEQ CORPORATION, Livonia, MI (US)

( * ) Notice: Subject to any disclaimer, the term of this patent is extended or adjusted under 35 U.S.C. 154(b) by 0 days.

(21) Appl. No.: 15/367,789

(22) Filed: Dec. 2, 2016

(65) Prior Publication Data

US 2017/0120700 A1 May 4, 2017

Related U.S. Application Data

(62) Division of application No. 14/067,063, filed on Oct. 30, 2013, now Pat. No. 9,539,866.

(60) Provisional application No. 61/721,761, filed on Nov. 2, 2012.

(51) Int. Cl.
  *B60C 23/04* (2006.01)
  *B60C 11/24* (2006.01)
  *G07C 5/00* (2006.01)
  *G07C 5/08* (2006.01)
  *G08G 1/017* (2006.01)

(52) U.S. Cl.
  CPC ........ *B60C 23/0479* (2013.01); *B60C 11/246* (2013.01); *B60C 23/04* (2013.01); *G07C 5/008* (2013.01); *G07C 5/0808* (2013.01); *G08G 1/0175* (2013.01)

(58) Field of Classification Search
  CPC ... B60C 23/04; B60C 11/246; B60C 23/0479; G08G 1/0175; G07C 5/0808; G07C 5/008
  See application file for complete search history.

(56) References Cited

U.S. PATENT DOCUMENTS

| | | | | |
|---|---|---|---|---|
| 4,398,172 A | * | 8/1983 | Carroll | G07B 15/00 250/338.1 |
| 5,883,306 A | * | 3/1999 | Hwang | G01B 5/18 116/34 R |
| 6,111,524 A | * | 8/2000 | Lesesky | B60R 16/0315 340/928 |
| 6,441,732 B1 | * | 8/2002 | Laitsaari | B60C 23/0401 340/438 |
| 6,804,999 B2 | * | 10/2004 | Okubo | B60C 23/0416 73/146 |
| 6,826,951 B1 | * | 12/2004 | Schuessler, Jr. | B60S 5/046 152/152.1 |

(Continued)

*Primary Examiner* — Jeffrey C Boomer
(74) *Attorney, Agent, or Firm* — Young Basile Hanlon & MacFarlane, P.C.

(57) ABSTRACT

An inspection system for use in measuring several vehicle conditions in a high volume vehicle inspection line. A plurality of sensors are installed on a vehicle for measuring a plurality of vehicle conditions to assist in the rapid evaluation of critical vehicle conditions or parameters. At least one tool is positioned along a vehicle path in a monitoring station. As the vehicle passes through the monitoring station, the tool received electronic data from the plurality of sensors and displays one or more signals to alert an inspector of acceptable or unacceptable vehicle conditions. In one example, the plurality of sensors includes tire pressure monitoring system (TPMS) data from the vehicle tires to rapidly assess the condition of the tire air pressure and other monitored tire conditions.

20 Claims, 5 Drawing Sheets

(56) References Cited

U.S. PATENT DOCUMENTS

| | | | | |
|---|---|---|---|---|
| 6,937,144 B2* | 8/2005 | Drake | ................ | B60C 23/0408 340/445 |
| 7,280,898 B2* | 10/2007 | Lesesky | ................ | G07C 5/008 701/31.5 |
| 7,449,993 B2* | 11/2008 | Lesesky | ................ | G07C 5/008 307/10.1 |
| 9,050,862 B2* | 6/2015 | Mouchet | ................ | B60C 23/02 |
| 9,779,561 B1* | 10/2017 | Dorrance | ................ | G07C 5/0808 |
| 2002/0130771 A1* | 9/2002 | Osborne | ................ | B60C 23/005 340/438 |
| 2003/0006895 A1* | 1/2003 | Drake | ................ | B60C 23/0408 340/445 |
| 2005/0030170 A1* | 2/2005 | Rieck | ................ | B60C 23/061 340/443 |
| 2007/0069877 A1* | 3/2007 | Fogelstrom | ................ | B60C 23/005 340/442 |
| 2007/0090928 A1* | 4/2007 | Deniau | ................ | B60C 23/0408 340/10.52 |
| 2009/0121856 A1* | 5/2009 | Stegman | ................ | B60C 23/0408 340/442 |
| 2011/0106464 A1* | 5/2011 | Petrucelli | ................ | B60C 23/006 702/50 |
| 2011/0205047 A1* | 8/2011 | Patel | ................ | B60C 23/0401 340/447 |
| 2012/0232753 A1* | 9/2012 | Lhuillier | ................ | B60C 23/0479 701/36 |
| 2012/0235807 A1* | 9/2012 | Rysenga | ................ | B60C 23/0416 340/445 |
| 2012/0296513 A1* | 11/2012 | Ramseyer | ................ | G06Q 10/02 701/29.6 |
| 2012/0323690 A1* | 12/2012 | Michael | ................ | G06Q 30/02 705/14.58 |
| 2013/0169813 A1* | 7/2013 | Schaefer | ................ | B60C 11/24 348/148 |
| 2013/0282231 A1* | 10/2013 | Farr | ................ | G06F 7/00 701/34.4 |
| 2014/0195099 A1* | 7/2014 | Chen | ................ | G07C 5/0808 701/29.6 |
| 2014/0288859 A1* | 9/2014 | Wittmann | ................ | G01L 17/005 702/55 |
| 2014/0308971 A1* | 10/2014 | O'Brien | ................ | H04W 4/046 455/456.1 |
| 2016/0236522 A1* | 8/2016 | Taki | ................ | B60C 23/04 |

* cited by examiner

HIGH VOLUME VEHICLE INSPECTION SYSTEM AND METHODS

CROSS REFERENCE TO RELATED APPLICATION

This divisional application claims priority benefit to U.S. patent application Ser. No. 14/067,063 filed Oct. 30, 2013 which claims priority benefit to U.S. Provisional Patent Application No. 61/721,761 filed Nov. 2, 2012, the contents of each application is incorporated herein by reference in its entirety.

TECHNICAL FIELD

The present invention is in the general field of monitoring and inspecting vehicle data and other conditions on vehicles.

BACKGROUND

In 2007, the United States implemented federal laws requiring most passenger vehicles to include a tire pressure monitoring system (TPMS) to monitor and alert drivers of low tire pressure which degrades vehicle efficiency and performance. Continued use of a tire with low tire pressure can cause premature wear of the tire and in the worst case, catastrophic tire failure.

One TPMS system is so-called direct TPMS. In direct TPMS, a tire sensor is installed in the wheels of each pneumatic vehicle tire, often on the valve stem. These sensors are capable of monitoring several conditions of the tire including: tire air pressure, tire temperature, wheel rotation speed and other conditions. The sensors themselves include a specific sensor identification code (ID) and are capable of receiving external electronic signals from an electronic control unit or module (ECU) in the vehicle, and in response, sending electronic signals wirelessly from inside the wheel to the vehicle ECU, which typically is connected to alert indications in the instrument panel in the interior of the passenger compartment. If a wheel sensor senses a tire pressure or other condition in a tire that is above or below a predetermined level, the sensor transmits a signal that is received by the ECU, and the ECU triggers an audio/visual indication to alert the driver to the condition. The sensors are similarly capable of receiving external electronic signals from an external TPMS monitoring tool and sending the electronic signals wirelessly from inside the wheel to the external tool.

Typical tire sensors used with TPMS systems are mounted on the valve stem or are strapped on the rim, although they could also be mounted against the tire wall, for example. An electronic module generally includes a small battery, a circuit board with communication antennas or coils (receive and transmit), an air pressure sensor, a temperature sensor, a rotation detection device or accelerometer, a programmable controller and a memory for storing the sensor specific ID and other information depending on the TPMS system and capabilities. Modules that do not include a battery are under development. Due to the installation inside the tire or valve stem, sensors are designed to be permanently installed within the tire. Due to the finite life of batteries, power consumption is purposely low and the sensors are initially placed in a "sleep" mode so as to not use power until the vehicle or individual wheel is installed or sold to an end user. During operation of the vehicle in the field, it is common for the sensors to not be active or continuously reporting information to the vehicle ECU or continuously transmitting for receipt by an external TPMS tool, but rather to perform tire condition checks at predetermined intervals to conserve battery life. Therefore, it is often necessary to awaken or active a TPMS wheel sensor to receive data from the sensor on the condition of the tire. When activated, the sensors emit a signal or signals which are received and interpreted by the ECU or a nearby external TPMS tool and processed according to preprogrammed instructions.

External TPMS tools and devices have been deployed in high volume to communicate with vehicle TPMS wheel sensors and ECUs in new vehicle manufacturing plants. In one example, a TPMS tool unit is placed on each side of an assembly line, typically near the end where completed or near completed vehicles pass, to awaken the TPMS wheel sensors and communicate with the ECU to ensure that the TPMS system was installed and is operating as designed when the vehicle leaves the plant and is transported for sale in the field. An example of one system is the ATEQ model VT520 manufactured by ATEQ Corp. which is the assignee of the present invention which is incorporated herein by reference. These prior systems have several limitations including, but not limited to, limited capability to recognize or read a small number of different tire sensors, are typically limited to variables/information relating only to the tire or sensor itself (air pressure, temperature, sensor battery life etc.) and they do not track or store historical data on a particular tire sensor, tire or vehicle. These systems further are designed primarily for indoor, controlled environments, for example in enclosed assembly facilities.

In many industries or fields, for example managing a fleet of hundreds of rental cars or taxis in a major city, it is important for an efficient fleet to maintain proper tire pressure to keep the vehicles in service as much as possible. It would be very disadvantageous for customers of, for example, rental cars to require road service or return the vehicle because of low tire pressure during the rental period. Equally, customers of rental cars may not respond to a low tire pressure condition as they normally would with their own vehicles, and drive on low air pressure which may result in an unsafe driving condition or may damage the tire and other vehicle systems costing the rental car company money to repair the rental car and place the rental car back into the fleet for use.

In such rental car and taxi industries, it is common for companies to manually check the tire air pressure of each tire every time a vehicle is returned from use to ensure that it is ready to be returned to the fleet for use. In high volume car rental businesses at major airports or taxi companies in major cities, hundreds of vehicles a day may be rented and returned or undergo shift changes by the taxi drivers. At rental car facilities, often one or more individuals will be required full time to manually check the tire pressure and other vehicle conditions prior to a rental car leaving the facility and/or when it is returned so the vehicle can quickly be placed back into the fleet for use.

Further, it is known that, for example, rental cars are often subject to abuse and theft in a number of ways while out in the field. For example, new tires on a rental car may be stolen/removed by a thief or crime organization and replaced with a worn set of tires before the vehicle is returned to the rental company. The stolen new tires, along with the TPMS wheel sensors, are then sold for a profit. Removal and resale of the TPMS wheel sensors, which are not visible unless the tire is removed, go undetected by the rental company when the vehicle is initially returned, and it can cost the rental company hundreds of dollars to replace and reinstall a new sensor once the theft is detected.

Relatively high volumes of vehicles can also be experienced by quick lube/oil change/repair facilities where vehicles are only in a facility for 10-15 minutes and a facility may have multiple bays or lanes to service multiple vehicles at the same time. It is common for these facilities to provide quick inspection of important vehicle systems, for example tire air pressure, other vital fluids, vehicle mileage and other systems.

It would be advantageous to create systems and processes to monitor or inspect selected vehicle tire conditions in a high volume throughput environment to improve on the present, highly labor intensive process of checking tire air pressure and other conditions, as well as deterring theft or abuse of tires and related equipment.

BRIEF SUMMARY

The present invention provides examples of improvements to existing TPMS tools including additional components, features, functions and methods of operation described below. The present invention is particularly advantageous in high volume applications where vehicles require a level of inspection in order to ensure the vehicle is ready for service and to promptly detect vehicle abuse, damage or theft.

In one example, a TPMS system is installed along a vehicle passageway where a high volume of vehicles may slowly pass and whereby preselected tire conditions are checked through use of the tool.

In one example, a TPMS tool is placed along each side of a vehicle passageway. The TPMS tool communicates with the TPMS sensor in each wheel that passes through a signal beam of the tool thereby activating the TPMS sensor which in turn sends tire condition data, for example tire air pressure, to the tool which detects and alerts a technician of acceptable or unacceptable conditions of the tire, for example low air pressure. If the tire conditions checked fall within acceptable predetermined standards, the vehicle can continue along for further inspection or be returned to the fleet for use. Identification of an unacceptable condition is immediately brought to the attention of the technician and can be remedied. In the example of theft or damage, the company can address the problem with the user avoiding loss by the company.

In another example, the TPMS tool may be equipped with or can be used with other sensors, for example an optical sensor or scanner to read or identify the specific vehicle identification number (VIN), license plate number or other vehicle or equipment identification tags or labels. Other examples of sensors may also be used to check other vehicle system conditions, for example vital vehicle fluid levels and internal components subject to wear, and enhance the evaluation of the tire conditions. For instance, in another example, the TPMS tool may be equipped or used with a sensor to evaluate the tire tread condition or profile to further inspect the tire condition and/or identify abuse or theft of tires and equipment that was installed on the vehicle prior to the last field use.

In another example, a monitoring/recording device is placed in and/or installed on the vehicle to periodically read, or continuously monitor in real time, vehicle data, for example tire air pressure and vital fluid levels. On the vehicle entering the inspection station, a station sensor sends a radio frequency (RF) or other signal to the on-board monitoring/recording device to retrieve the present and previously recorded data. In this example, since the vehicle inspection data is monitored in the onboard device, only one station sensor, or a fewer number of station sensors, is needed to retrieve the desired tire and/or other vehicle and system data.

BRIEF DESCRIPTION OF THE DRAWINGS

The description herein makes reference to the accompanying drawings wherein like reference numerals refer to like parts throughout the several views, and wherein.

DETAILED DESCRIPTION OF EXAMPLES OF THE INVENTION

Referring to FIGS. 1-5, examples of a high volume vehicle inspection system and methods are illustrated and described below.

Figure 1:
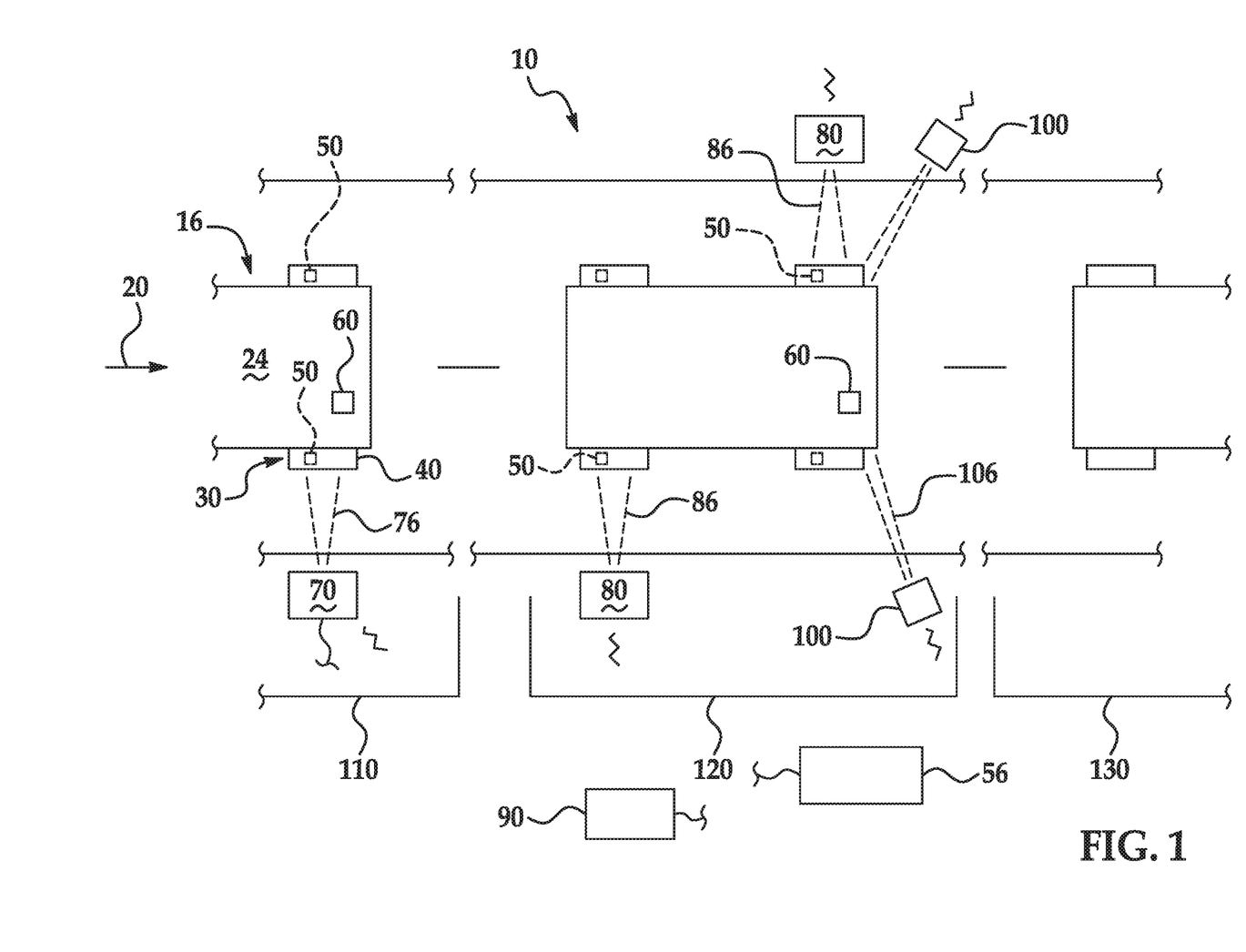
FIG. 1 is a schematic plan view of an example of a vehicle passageway using an example of the vehicle tire monitoring system.

Referring to FIG. 1, an example of a high volume vehicle tire inspection system 10 is shown. In the example, the inspection system 10 is used to inspect pneumatic tires on a vehicle 16 that is driven or otherwise passed through a discrete, predetermined path of travel 20, for example, a vehicle return lane at a car rental facility or taxi cab vehicle station or facility. It is understood that other applications known by those skilled in the art may be used where a relatively high volume of vehicles are inspected, or where minimal manual labor for the below-described inspections, is desired. For example, the system 10 could be employed for relatively high volume commercial fleet trucks and other devices used to transport persons or cargo. As use of tire monitoring tools become more widespread and costs to implement are reduced, the use of such devices will also expand. For example, it is contemplated system 10 may be used in high volume bicycle rental facilities and other such applications known by those skilled in the art.

In the example, vehicle 16 is a production passenger vehicle having a vehicle body 24 with four wheels and pneumatic tires 30, each tire 30 having a tread or profile 40. In the example, the vehicle 16 includes a tire pressure monitoring system (TPMS) which includes a wheel sensor 50 installed on the interior of each wheel or tire 30, often in the valve stem extending from the tire 30. As described above, the sensor 50 typically includes its own power source and is capable of receiving and transmitting data signals (continuous or pulsed) which can be read by the vehicle ECU or an external TPMS sensor tool 80 described below. Conventional wheel sensors 50 can measure a plurality of conditions including tire pressure, temperature, tire rotation and others. Sensors 50 typically communicate a specific sensor ID and the internal battery or power source life or status. Sensors are under continuous development and capabilities being increased, for example, sensors without a battery which are powered by motion, induction or other means.

In the example shown in FIG. 1, in an exemplary application in a vehicle rental return line having a return lane or path of travel 20, vehicles 16 are returned after use in the field, for example a week-long rental by an out-of-town traveler. The vehicle 16 may have experienced normal, uneventful wear however, the vehicle 16 may have experienced a harsh event. For example, one or more tires 30 may have hit a curb or large pothole, may have been punctured and started leaking air pressure or may have been subject to theft or abuse as described above. Under any of these conditions, rental facilities typically have only a few minutes to perform a cursory inspection of the vehicle 16 and tires 30 before the traveler/customer completes the return process and leaves the facility. Due to the high volume, it is most advantageous for the rental facility to place the vehicle 16 back into the fleet for use by another customer as soon as possible.

In the example, the returned vehicle 16 may enter a first station 110. In station 110, the vehicle is preferably positively identified to ensure the rental facility that this is the vehicle that was rented and, for example, not another rental agency's vehicle. One way to identify the vehicle is to scan or otherwise input the vehicle's identification number (VIN) which is specific to each vehicle manufactured regardless of make or model. The VIN number is a multi-digit, alphanumeric code typically placed inside the passenger compartment down toward the bottom of the windshield where it can be seen from the exterior of the vehicle, and is purposely placed and secured to make it difficult to remove or switch with another VIN. Preferably, the VIN number can be optically scanned and quickly recorded without manual input which would be slow and susceptible to human input error due to the alphanumeric nature of the code. In one method, a hand-held, portable scanner device (not shown) can be used by a technician to scan the VIN number and wirelessly send it to a central device or controller 56 to temporarily store the information for coordination with other data in the inspection described below or with previously stored data in a central database or other data repository for the rental facility.

In an alternate method shown in FIG. 1, the vehicle 16 can include a visual label or tag 60 which includes identification data which can be automatically scanned or optically read by a reader 70 stationarily positioned along the path of travel 20 as generally shown. The tag 60 can be a label with a bar or QR code, a radio frequency identification (RFID) tag or other device having indicia that can be quickly and electronically retrieved from the vehicle and transmitted to a controller 56 or other device for interpretation and processing. Other identification tags, vision systems, optical scanning and reading and optical character recognition devices and processes known by those skilled in the art may be used.

In the example shown, the tag 60 is positioned to necessarily pass through the vision or beam 76 as the vehicle travels through station 110 as generally shown. Preferably, the vehicle does not have to stop, but may continuously move through station 110 at an efficient rate of speed to maximize efficiency of the inspection. The scanned vehicle ID is electronically transferred to controller 56 for further use as described below. Alternately, the reader 70 can be positioned so the beam 76 necessarily passes over the tag 60 on the vehicle.

In an alternate example, other devices to positively identify the specific vehicle 16 may be used, for example scanning or reading the vehicle license plate, which can be cross-checked with stored data to ensure the vehicle identification and that the license plate has not been switched with another vehicle. This can be accomplished through conventional vision systems, cameras or other devices which can automatically interpret the data or through manual review by a human technician for positive verification, for example at a central monitoring station 90.

In the example shown in FIG. 1, a second station 120 sequentially follows first station 110. Preferably, after the vehicle 16 has been positively identified through reader 70, the TPMS tire sensors 50 are activated and by a TPMS tool 80 positioned on each side of the path of travel 20 as generally shown. In the example, and as further described above, each tool 80 sends a low frequency signal or beam 86 which awakens or activates an adjacent TPMS sensor 50 in each wheel as it passes through the beam 86. Depending on sophistication and capabilities of the tool 80 and sensor 50, data is transmitted by the sensor 50 and received by the adjacent tool 80 for analysis and further processing by the tool 80 or controller/processor 56 which is in electronic communication, preferably wireless, with each tool 80. An example of a tool 80 that has been employed in an indoor environment, and would require some modification, for example protection from exterior environment, is ATEQ model VT and VT520 manufactured by ATEQ Corp. which is the assignee of the present invention.

As described above, in a rental car facility application, tire air pressure is the most useful condition to be measured, however, many other conditions known by those skilled in the art can also be read from the sensor 50 or other sensors or monitors and processed by the tool 80 and controller/processor 56 depending on the needs of the facility. For example, where a vehicle is equipped with sensors for other vehicle systems, vital fluid levels, for example, engine oil, coolant and brake fluid may be wirelessly checked by system 10 using the TPMS tool 80 or other devices and processes in communication and used therewith. In the example, the tool 80 and fluid level sensors can communicate through radio frequency (FR) signals or through other communication methods known by those skilled in the art. Further, where additional vehicle sensors or monitors are employed, components subject to wear, for example brake pads may be read or signals received to further enhance the vehicle inspection process.

Using tire air pressure as an example only, on receipt of the transmitted tire pressure data for each tire 30 and respective sensor 50, various levels of analysis can take place to provide an indication if the tire is within a standard or acceptable pressure range to allow the vehicle 16 to be placed back into the fleet for service or whether the tire requires adjustment of the air pressure or further inspection before returning to service. For example, in a very simple system applying minimal analysis, the tool 80 or controller/processor 56 can have a preprogrammed acceptable range, for example tire pressure between 28-40 pounds per square inch (psi). If the received pressure from a tire sensor 50 falls within this range, a simple pass or clear indicator can displayed on the tool 80 or at a central monitoring station 90 in electronic communication with the reader 70, tool 80, central controller 56 and other equipment.

In a more sophisticated system 10, the sensor 50 specific ID can be read and the current pressure reading of the tire associated to that sensor can be compared to, for example, electronically stored prior or historical pressure measurements for that tire. This, for example, may provide an indication that a particular tire has a slow leak over the past few days, weeks or months requiring service of the tire. If historical pressure or other sensor-transmitted data shows a pattern of problems with a particular tire 30 or sensor 50, the problem can be identified and resolved increasing efficiency of the vehicle 16 for the fleet.

In an alternate example of a more sophisticated system 10 and sensors 50 where additional sensor-transmitted data is received and analyzed, one or more of the sensor 50 ID, battery life of the sensor 50, temperature, revolution data and other conditions can be analyzed by tool 80 and controller/processor 56 and monitoring station 90. For example, by checking the sensor ID, it can be verified that the tire has not been changed and is in the same location on the vehicle 16 when it last left the rental facility. If the tire was abused or damaged and the vehicle's spare tire has been put on, the system 10 will detect this vehicle condition and further inspect the vehicle. If the original tires on the vehicle 16 have been stolen, the sensor 50 IDs won't match the previously recorded data for that vehicle 16. If the sensor has been removed or stolen, no signal will be transmitted and an abuse or theft immediately identified. If a tire's temperature is higher than a normal range, that may signal a defect or hazardous condition of the tire requiring a closer inspection or replacement to prevent a breakdown of the vehicle 16 in the field requiring road service. If the sensor 50 has low battery life remaining, the TPMS sensor can be scheduled to be changed at the next regularly scheduled service time. Other conditions, analyses, comparisons known by those skilled in the field using the above described equipment may be used. It is further understood that first 110 and second 120 stations may be a single station or divided into additional stations to suit the particular application and level of inspection.

Referring to FIG. 1, an optional tire profile or tread sensor 100 is also used on each side of the vehicle 16 path of travel 20. Tire profile sensors can be similarly used to automatically inspect the profile or tread 40 of each tire 30 that passes through a beam or field of vision 106 of each sensor. The sensors 100 are similarly placed in electronic communication with the tool 80, controller/processor 56 and monitoring station 90 as described above. In the example, tire profile sensors 100 scan or read an image of the tire tread for predetermined inspection parameters, for example, to identify if the tread wear has reached a low level and requires replacement with a new tire, a different tire has been placed on the vehicle possibly indicating abuse or theft, or other conditions known by those skilled in the art. An example of sensor 100 may use lasers to scan or read the tire tread. Appropriate software would be used to read the scanned data to identify the tire manufacturer, model of tire and possibly other tire information known by those skilled in the art. In one example, the tread sensor 100 may include a manual override or bypass if a tire to be scanned includes debris on the tread, for example mud or snow, which prevents an accurate scan/read of the tire by the laser or visions systems. Alternate examples may employ a vision system where cameras or other image capturing devices are used. It is understood that additional inspection equipment (not shown) for use in inspecting conditions of tires known by those skilled in the art can be used in system 10.

In an example not shown, the tool 80, whether stationary or in a portable or handheld device form, include features which measure and take into account the absolute air pressure for more accurate readings under the location and environmental conditions. In another example not shown the tool 80 measures the environmental temperature, the temperature of the vehicle tire air pressure and/or temperature of the tire rubber for more accurate readings and data. In one example, a processor in the tool compensates for the measured absolute pressure or temperatures for more accurate assessment and accurate data for the technician or user. These exemplary features are descried in U.S. patent application Ser. No. 13/687,000 filed Nov. 28, 2012 which are incorporated herein by reference.

In FIG. 1, an exemplary third station 130 is shown sequentially following second station 102. Following inspection at the first 110 and second stations 120, vehicles that pass or have conditions within the predetermined standards can return to the fleet or proceed along for further processing or inspection as desired by the user, for example rental fleet or taxi service. If an identified condition by system 10 requires further inspection or repair, the vehicle 10 can be transferred or re-routed to the appropriate area for further inspection or repair. It is understood that third station 130 can be combined with second station 102 or that one or more of the inspections or equipment from station 110 or 120 can be placed in station 130 to suit the particular application.

Figure 2:
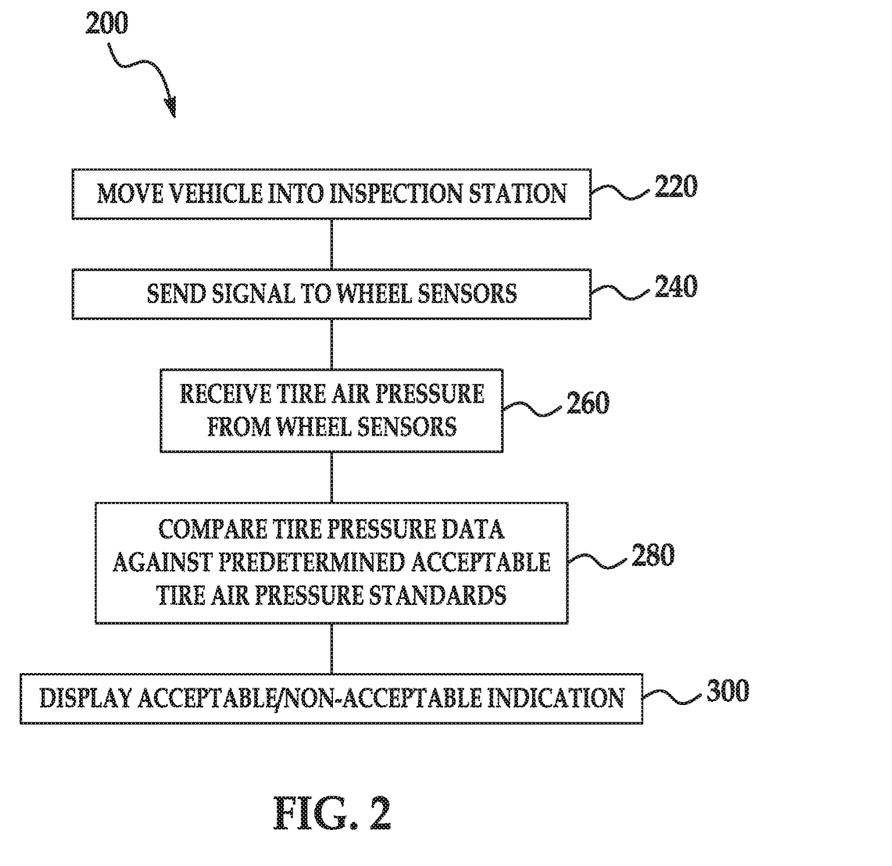
FIG. 2 is a schematic flow chart of one example implementation of the vehicle tire monitoring system where tire pressure is checked along the exemplary vehicle passageway.

Referring to FIG. 2, an example of a process 200 for inspecting vehicular tires for use in, for example a car rental return lane or area, is illustrated. In the example, the exemplary application is a car rental return lane or area and an exemplary procedure of simply checking or inspecting the tire air pressure in each tire similar to that described using FIG. 1.

In the example process 200, the first step 220 is to move a vehicle returning from use in the field into an inspection station, for example a designated path or area 20 having station 110 shown in FIG. 1. Where the specific identification of the vehicle is not required, the inspection station for step 220 may be the second station 120 and into the field of vision or through the beams of TPMS sensors 80 as described above. Although process 200 is described as being used when a vehicle 16 returns from the field, it is understood that process 200 and the equipment shown in FIG. 1 can also be used and/or repeated when a vehicle has been idle or is ready to go into use in the field. For example, before a rental car or taxi is provided to a customer or driver, a rental or taxi facility may use the system 10 and process 200 just prior to the customer or driver taking delivery and using the vehicle to ensure, for example, a tire has not leaked air pressure below an acceptable level overnight or since the vehicle returned to the facility and passed inspection. Other uses of the system 10 and process 200 known by those skilled in the art may be used.

In exemplary step 240, the vehicle 16 is driven or positioned so the front and rear tires 30 sequentially pass by, or are momentary stopped in the field of vision or in sufficient proximity, so the wheel sensors 50 sequentially receive the signal transmitted from TPMS tools 80. The TPMS wheel sensors 50 measure predetermined conditions of the tire 30, for example tire air pressure, and in step 260 transmit a data signal in a manner described above for receipt by the adjacent tool 80.

In step 280, the received sensor transmitted data signal is compared to a predetermined standard or range stored in memory in the tool 80, in a controller/processor 56 or some other remote device, to determine if the tire condition, in this example tire pressure, is within acceptable bounds for continued service. As described for FIG. 1 above, additional data or ranges, for example historical data for that particular tire for a particular measured condition, can be compared or analyzed depending on the application or needs of the facility/user. It is understood that other conditions may be checked as previously described.

In step 300, the results of the comparison of the measured pressure against the acceptable standard are displayed on the tool 80 or other device, for example a remote monitoring station 90 for a technician or other operator to quickly review and determine if the vehicle remains acceptable for continued service. It is understood that in the most simplistic system, the measured tire pressure from the sensor 50 may be transmitted directly to a visual display for a technician without comparison to an acceptable range, but just viewed and analyzed by the technician. For example, the measured pressure of a tire 30 at 32 psi could just be read by tool 80 and displayed on a monitor or at a remote monitoring station 90 where the technician approves as an acceptable pressure. The vehicle 16 is then moved out of the station for further processing or returned to the fleet depending on the facility. It is understood that process 200 can be used for other applications other than rental car or taxi facilities as understood by those skilled in the art.

Figure 3:
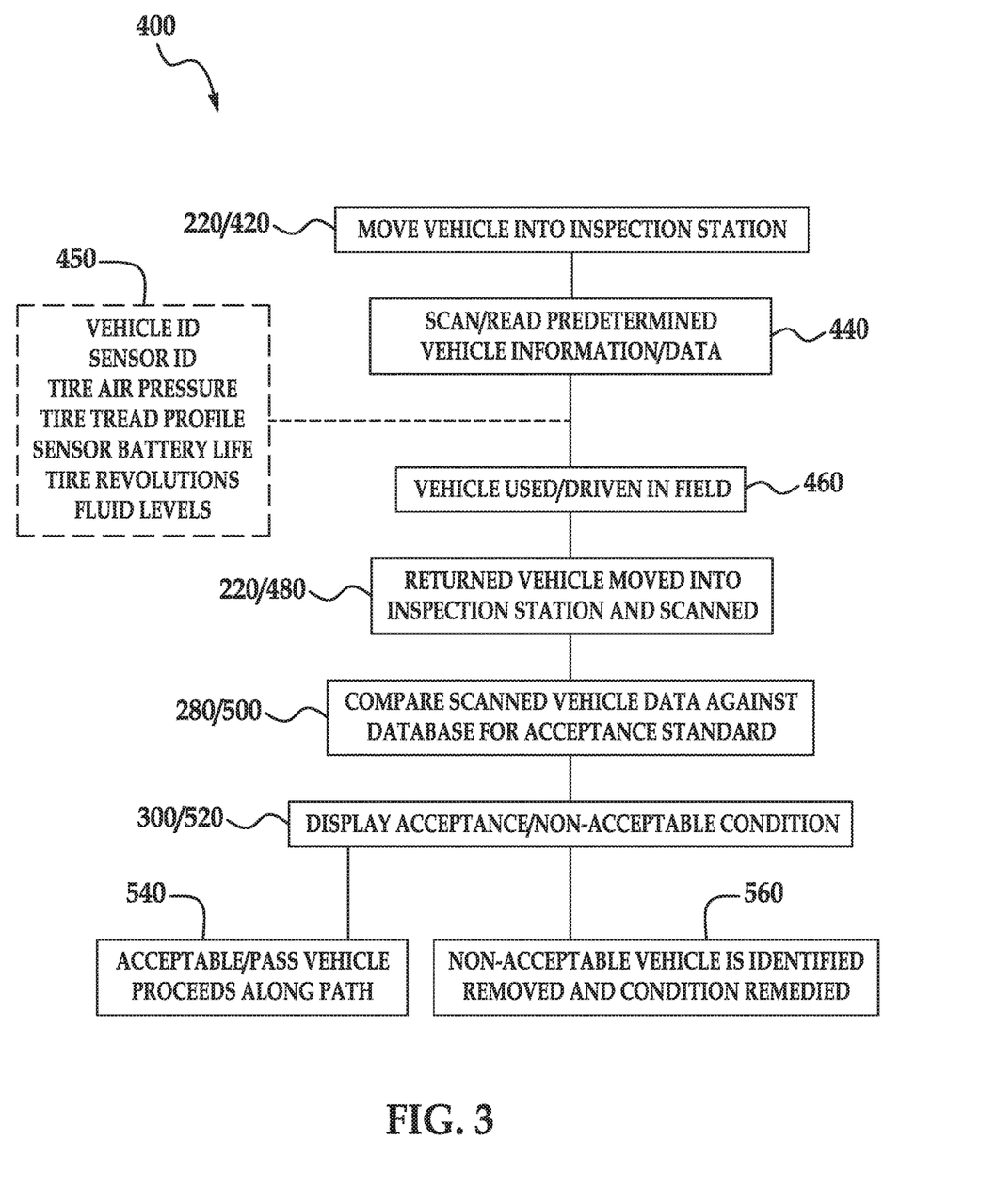
FIG. 3 is an alternate schematic flow chart of FIG. 2 showing an example process where vehicle inspection takes place before and after a vehicle is used in the field.

Referring to FIG. 3, an alternate example of a process 400 for inspecting vehicle tires shown in FIG. 2 is illustrated. In step 420, a vehicle 16 is moved into an inspection station along a path of travel 20 as described for step 220 in FIG. 2. In this station, however, the vehicle identification is scanned or read in step 440 in any manner as described above, for example a hand held scanner to read the vehicle 16's VIN number or license plate. This step 440 can typically be performed when the vehicle 16 leaves an area, for example the third station 130 shown in FIG. 1 at a car rental facility before it is allowed to pass into the field so positive data of which vehicle 16 has left is recorded.

In an optional step 450 additional information can be recorded, for example when the vehicle 16 is moved through a second station 120 and, for example, tools 80 and 100 are used to scan and record tire conditions described above before the vehicle 16 leaves the facility for use in the field in step 460. Other vehicle systems and components, for example fluid levels and components subject to wear, may be checked/monitored and/or compared to pre-stored acceptable ranges and historical data in the manner described above.

In step 480, the vehicle 16 on returning from use in the field enters the return lane or area in station 110 as described in step 220 above.

In step 500, the data transmitted by the sensor 50 to tool 80 is compared in a manner generally described in step 280. As described above, if multiple sensor data, for example tire pressure, temperature and sensor ID is measured and transmitted, each type of data or measurement is compared to a respective range or data preferably stored in memory in electronic communication with a controller/processor 56 or other device. The type and level of comparison and analysis is dependent on the application and equipment used.

In step 520 the results of the comparison are displayed on a visual display or monitoring station where a technician is situated as described for step 300 above. It is understood that other pass/fail indicators may be used such as sounds and other perceptible indicators.

In step 540, if the inspection results are within acceptable levels, the vehicle is passed/approved and proceeds to the next inspection as determined by the fleet owner or is returned to the fleet.

If a measured tire condition falls outside of the predetermined range, or a sensor 50 is not detected, or information received is not consistent with the data recorded in step 440 when the vehicle left the facility, a warning or cautionary indicator is displayed or otherwise made known in step 560 so a technician can further investigate the problem and/or initiate a remedy so the vehicle can return to the fleet or taxi route as quickly as possible. In most situations, the vehicle would be removed from the process of returned to the fleet until the condition is remedied. It is understood that additional steps or the reordering of steps may take place to suit the particular application and vary the inspection as known by those skilled in the art without deviating from the present invention.

Figure 4:
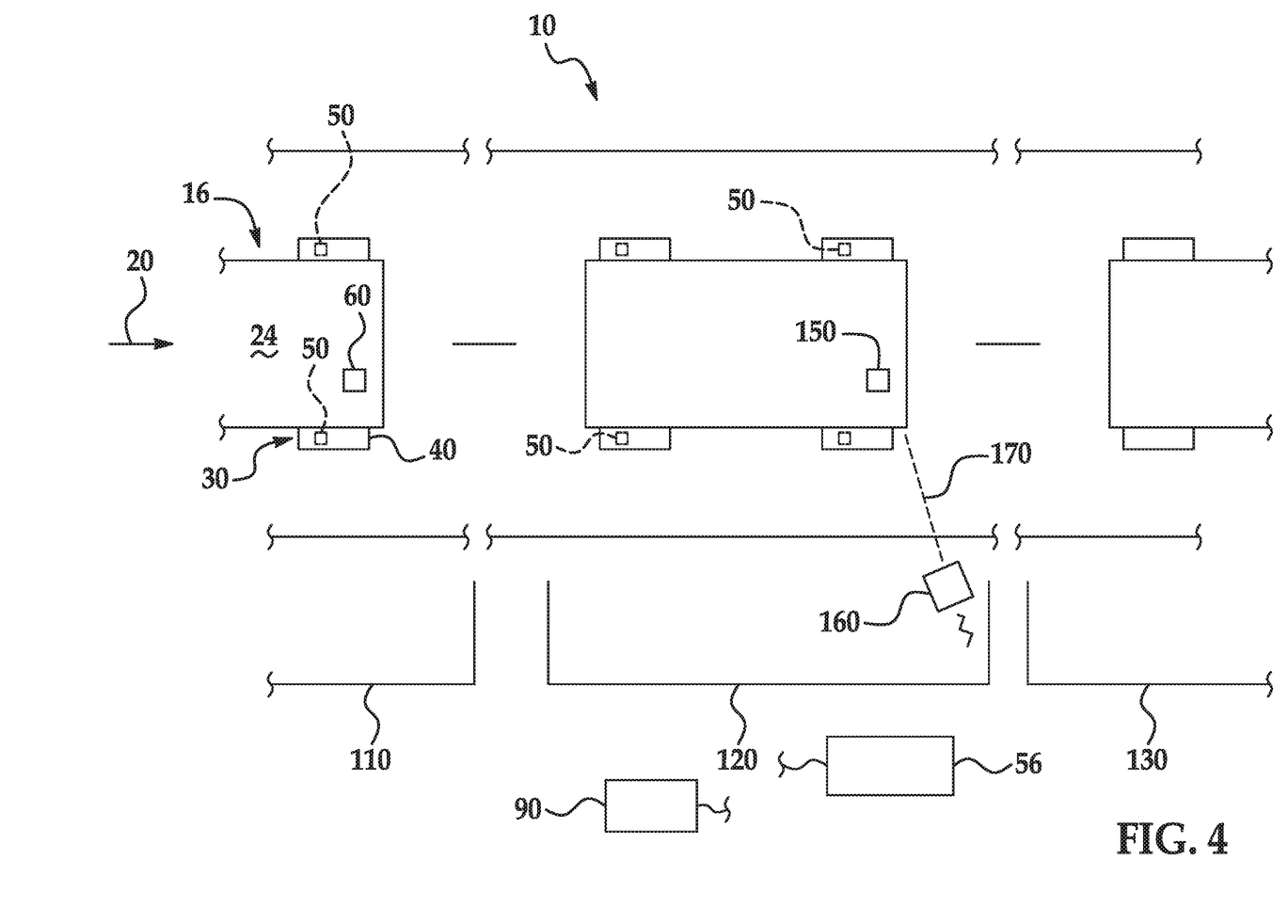
FIG. 4 is an alternate schematic plan view of the example vehicle passageway shown in FIG. 1.
Figure 5:
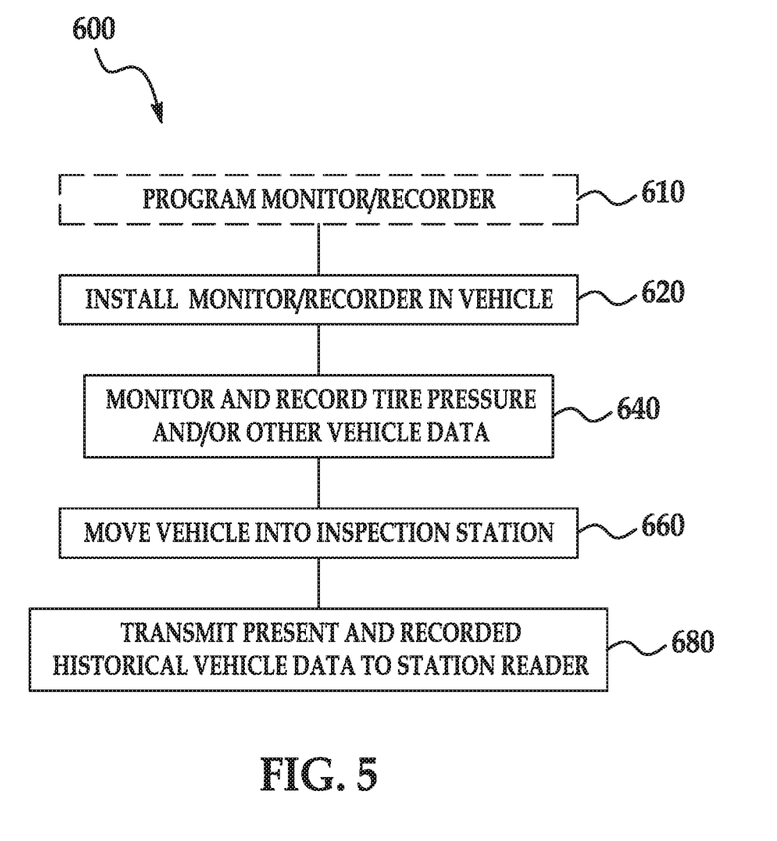
FIG. 5 is a schematic flow chart of an alternate example of FIGS. 2 and 3 where tire pressure and optionally other conditions are retrieved from an example of an onboard device.

Referring to FIGS. 4 and 5, an alternate example of the devices and processes described above are illustrated. Components having the same general features and functions previously described have the same numbers as the prior Figures.

Referring to FIG. 4, a small monitoring device 150, which preferably has recording and electronic data storage capabilities, is installed on-board the vehicle 16 in a convenient location. The monitoring device 150 can periodically or continuously monitor a plurality of vehicle data, for example, tire air pressure through communication with the TPMS sensors 50 in the wheels as described above. The device 150 can monitor and record other vehicle data as described above.

With the tire and possibly other vehicle data received and stored on the device 150, on the vehicle entering the return line path 20 and one or more vehicle stations 110, 120 and 130, the monitored and recorded vehicle data can be centrally retrieved from device 150. In one example, a single reader 160 may be positioned in a station, versus at least two readers 80 positioned on opposite sides of the path 20 to retrieve the tire pressure data shown in FIG. 1. This reduces the number of equipment and capital investment required for the system 10 as previously described. It is understood that one or more of the sensors and features described in FIG. 1 may also be used with device 150 to meet the specific application and as known by those skilled in the art.

In one example, the device 150 and reader 160 operate on radio frequency (RF) versus the typical low frequency (LF) signals used in TPMS systems. A benefit of using RF is the extended range of transmission and reception over LF. In the example shown in FIG. 4, on entrance of the vehicle 16 into the inspection station, the reader 160 may send a RF signal to the monitoring/recording device 150 to initiate gathering and transmission of the present or previously recorded vehicle data that was monitored and recorded by the device 150. Due to the extended RF range of the device 150 and reader 160, the reader may be logistically further away in a more sheltered or convenient position in the inspection station. The reader 160 may then analyze the data or further transmit the data to the central controller 56 or monitoring station 90 as previously described to alert a human operator of the vehicle conditions. Other devices and methods of communication between the device 150 and reader 160 known by those skilled in the art may be used.

FIG. 5 illustrates an alternate process 600 for inspecting vehicles in a high volume environment corresponding to the device 150 and reader 160 as described and illustrated in FIG. 4. In the example, a first step 620 would involve installation of the device 150 into the vehicle 16. The location of device 150 in the vehicle 16 may be in many areas to suit the particular vehicle 16 or the application and function with the reader 160 and overall system 10. In one example, the device 150 can be hidden from a users view and secured in a protected area. Alternately, the device 150 could include a user visual display and display real or substantially real-time data retrieved from the vehicle 16 to keep the user apprised of vehicle conditions. Alternately, the device 150 can include electronic communication ports for communication with the vehicle 16 existing systems, for example the vehicle electronic control unit (ECU) through the OBDII port or connection in the vehicle 16. Other locations for the device 150 on-board the vehicle 16 known by those skilled in the art may be used.

In an optional step 610, the device 150 prior to installation on-board the vehicle 16, can be initially programmed or reprogrammed if already in use. In one example on an initial or first installation, for example in a new rental car, the device 160 can be loaded with data particular to that vehicle, for example the VIN number, the TPMS sensor 50 IDs and other data parameters specific to that vehicle. The information can be manually input through a user interface on the device 150 if so equipped or uploaded from a personal computer or other device through a USB port or other data port on the device 150 known by those skilled in the art.

Once programmed and installed on the vehicle 16, the device 150, as it is selectively programmed to do, will continuously or periodically monitor and if so equipped, record and electronically store, vehicle data, for example tire air pressure in step 640. As noted above, many other vehicle data types can be monitored and recorded depending on the required application and sophistication of the sensors and readers.

In step 660, on return of the vehicle 16 to the inspection system 10, for example in a rental car return facility, the reader 160 will send a signal 170 to the device 150 to initiate the process for the device 150 to gather and transmit the present or recorded vehicle data, for example tire air pressure, to the reader 160 in step 680 for further processing as described above. As noted, preferably, the signal transmissions used by the device 150 and 160 are RF, but other, as well as multiple, forms of communication may be used. In additional steps (not shown) the data received by reader 160 can be further processed or transmitted for further analysis and electronic storage for historical data purposes as described above.

Depending on the level of vehicle data needed for the inspection application, it is conceivable that with use of the central, on-board device 150 and reader 160, a single inspection station, with a minimal amount of readers and other devices, may be employed.

As noted above, the number of steps and organization of steps in process 600 may be used as known by those skilled in the art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of inspecting one or more vehicle operating conditions of each of a high volume quantity of transportation vehicles comprising:
    establishing a vehicle path of travel for a high volume quantity of transportation vehicles to pass through a vehicle inspection station, each vehicle having a tire pressure monitoring system (TPMS) sensor connected to a pneumatic tire and in communication with an air pressure of the tire;
    positioning a TPMS tool adjacent the vehicle path of travel in the vehicle inspection station, the TPMS tool physically unconnected and remotely positioned from the TPMS sensor, the TPMS tool projecting a data communication beam into a portion of the vehicle path of travel in the inspection station;
    sequentially passing each of the high volume quantity of vehicles on the vehicle path of travel through the vehicle inspection station wherein the TPMS sensor passes through the TPMS tool data communication beam;
    the TPMS sensor measuring the actual tire air pressure and transmitting the measured actual tire air pressure on each passage of the respective vehicle through the vehicle inspection station;
    receiving by the TPMS tool from the TPMS sensor a first tire air pressure measurement of the actual tire air pressure as the respective vehicle having the TPMS sensor moves on the vehicle path of travel passing through the vehicle inspection station at a first time;
    storing the TPMS sensor first tire air pressure measurement of the actual tire air pressure in an electronic data memory storage device physically unconnected and remotely positioned from the TPMS sensor, the electronic data memory storage device in data communication with the TPMS tool;
    receiving by the TPMS tool from the TPMS sensor a second tire air pressure measurement of the actual tire air pressure as the respective vehicle having the TPMS sensor moves on the vehicle path of travel passing through the vehicle inspection station at a second time subsequent to the first time;
    comparing by a processor the stored in memory TPMS sensor first tire air pressure measurement of the actual tire air pressure and the received TPMS sensor second tire air pressure measurement of the actual tire air pressure, the processor in data communication with the TPMS tool and the electronic data memory storage device and physically unconnected and remotely positioned from the TPMS sensor; and
    signaling a user a predetermined signal based on the remotely positioned processor comparison of the stored in memory TPMS sensor first tire air pressure measurement of the actual tire air pressure and the received TPMS sensor second tire air pressure measurement of the actual tire air pressure.

2. The method of claim 1 wherein inspecting one or more vehicle operating conditions further comprises inspecting a tire tread condition of each of a plurality of tires mounted to each of the high volume quantity of transportation vehicles, the method further comprises:
    stationarily positioning in the inspection station a first tire tread sensor adjacent a first side of the vehicle path of travel and a second tire tread sensor adjacent a second side of the vehicle path of travel opposite the first side;
    measuring through respective of the first and the second tire tread sensor a tire tread condition of each respective tire of each of the high volume quantity of vehicles moving passed respective of the first or the second tire tread sensor; and
    signaling the user the respective measured tire tread condition from the respective first tire tread sensor and the second tire tread sensor.

3. The method of claim 1 wherein inspecting one or more vehicle operating conditions further comprises inspecting a vehicle fluid condition of each of the high volume quantity of vehicles, wherein each vehicle includes a fluid condition sensor, the method further comprising the steps of:
- the fluid condition sensor measuring the fluid condition and transmitting the measured fluid condition on each passage of the respective vehicle through the inspection station;
- receiving by the remotely positioned tool from the fluid condition sensor a fluid condition sensor first measurement at the first time;
- storing in the remotely positioned electronic data memory storage device the fluid condition sensor first measurement;
- receiving by the remotely positioned tool from the fluid condition sensor a fluid condition sensor second measurement at the second time subsequent to the first time;
- comparing the stored in memory fluid condition sensor first measurement and the received fluid condition sensor second measurement; and
- signaling the user a predetermined signal based on the comparison of the stored in memory fluid condition sensor first measurement and the received fluid condition sensor second measurement.

4. The method of claim 1 further comprising the step of:
- storing the TPMS sensor second tire air pressure measurement actual tire air pressure in the remotely positioned electronic data memory device, the processor comparing the stored in memory TPMS sensor first tire air pressure measurement of the actual tire air pressure and the stored in memory TPMS sensor second tire air pressure measurement of the actual tire air pressure.

5. The method of claim 1 wherein the TPMS sensor comprises a first TPMS sensor positioned on a first side of each respective vehicle and a second TPMS sensor positioned on a second side of each respective vehicle, each of the first and the second TPMS sensors in communication with the air pressure of the respective tire, the step of positioning a TPMS tool further comprises:
- stationarily positioning a first TPMS tool adjacent a first side of the vehicle path of travel in the vehicle inspection station, the first TPMS tool projecting a first TPMS tool data communication beam into a portion of the vehicle path of travel whereby the first TPMS sensor positioned on a first side of the vehicle passes through the first TPMS tool data communication beam when the vehicle passes through the vehicle inspection station; and
- stationarily positioning a second TPMS tool adjacent a second side of the vehicle path of travel opposite the first side of the vehicle path of travel in the vehicle inspection station, the second TPMS tool projecting a second TPMS tool data communication beam into a portion of the vehicle path of travel whereby the second TPMS sensor positioned on a second side of the vehicle opposite the first side of the vehicle passes through the first TPMS tool data communication beam when the vehicle passes through the vehicle inspection station, wherein each of the first and the second TPMS tools are physically unconnected and remotely positioned from the first TPMS sensor and the second TPMS sensor, each of the first TPMS tool and the second TPMS tool receiving respective of the first and the second tire air pressure measurement actual tire air pressure from respective of the first and the second TPMS sensors at respective of the first and the second times, wherein the respective first and the second TPMS sensors first TPMS tire air pressure measurements of actual tire air pressure are respectively stored in the remotely positioned electronic data memory storage device, the remotely positioned processor comparing the respective stored in memory TPMS sensor first tire air pressure measurement of actual tire air pressure to the respective received TPMS sensor second tire air pressure measurement of actual tire air pressure, and signaling the user the predetermined signal based on the comparison of the respective TPMS sensor first tire air pressure measurement of actual tire air pressure and the respective received TPMS sensor second tire air pressure measurement of actual tire air pressure.

6. The method of claim 1 wherein inspecting one or more vehicle operating conditions further comprises inspecting a unique vehicle identification for each of the high volume quantity of vehicles on each passage of the respective vehicle through the vehicle inspection station, the method further comprising:
- prestoring in the remotely positioned electronic data memory storage device the unique vehicle identification for each respective vehicle of the high volume quantity of transportation vehicles having a respective TPMS sensor;
- receiving by a vehicle identification reader tool positioned adjacent the vehicle inspection station the unique vehicle identification specific to each of the high volume quantity of transportation vehicles having a respective TPMS sensor as each respective vehicle moves on the vehicle path of travel passing through the inspection station at the first time;
- comparing by the remotely positioned processor the prestored in memory unique vehicle identification and the received unique vehicle identification specific to each respective vehicle passing through the vehicle inspection station at the first time; and
- signaling a user a predetermined signal based on the remotely positioned processor comparison of the prestored in memory unique vehicle identification and the received unique vehicle identification specific to each respective vehicle passing through the vehicle inspection station at the first time.

7. The method of claim 6 wherein the step of receiving by the vehicle identification reader tool the vehicle identification specific to each of the high volume quantity of transportation vehicles passing through the vehicle inspection station at the first time further comprises the step of:
- imaging vehicle identification indicia positioned on each respective vehicle by an imaging device positioned in a first station positioned on the vehicle path of travel in communication with the vehicle inspection station, the imaging taken as each of the respective vehicles moves on the vehicle path of travel passing through the first station.

8. The method of claim 6 wherein each TPMS sensor on respective of the high volume quantity of transportation vehicles further comprises a TPMS sensor unique identification specific to each TPMS sensor, each respective TPMS sensor operable to transmit the TPMS sensor unique identification on each passage of the respective vehicle through the vehicle inspection station, the method further comprising:
- for each prestored in memory unique vehicle identification, prestoring in the remotely positioned electronic data memory storage device each TPMS sensor unique identification for the prestored in memory unique vehicle identification;

receiving by the remotely positioned TPMS tool from each respective TPMS sensor passing through the TPMS tool data communication beam the respective TPMS sensor unique identification as the respective vehicle moves on the vehicle path of travel passing through the vehicle inspection station at the first time;

comparing by the remotely positioned processor the prestored in memory TPMS sensor unique identification for the prestored in memory unique vehicle identification to the received TPMS sensor unique identification at the first time; and signaling a user a predetermined signal based on the remotely positioned processor comparison of the prestored in memory unique vehicle identification and TPMS sensor unique identification to the received TPMS sensor unique identification.

9. The method of claim 8 wherein the step of storing the TPMS sensor first tire air pressure measurement of the actual tire air pressure further comprises storage for a period of time of at least a week, the comparison of the stored in memory for at least a week TPMS sensor first tire air pressure measurement of the actual tire air pressure to the received TPMS sensor second tire air pressure measurement of the actual tire air pressure operable to indicate if there is a slow air pressure leak for the particular tire having the TPMS sensor unique identification.

10. The method of claim 8 wherein the comparison results of the prestored in memory unique vehicle identification and TPMS sensor unique identification to the received TPMS unique sensor identification at the first time are not consistent, the signaling the user a predetermined signal comprises a warning signal.

11. The method of claim 8 wherein each of the high volume quantity of vehicles sequentially passes through the vehicle inspection station at a plurality of times, each time subsequent to a previous time, each pass through the vehicle inspection station the tool thereby receiving a tire air pressure measurement of the actual tire air pressure of the respective tire generating a plurality of tire air pressure measurements of the actual tire air pressure for the respective tire over the plurality of times;

sequentially storing in the remotely positioned electronic data memory storage device the plurality of received tire air pressure measurements of the actual tire air pressure for historical comparison to a last in time received tire air pressure measurement of the actual tire air pressure; and comparing by the remotely positioned processor for the respective tire the last in time received tire air pressure measurement of the actual tire air pressure to the stored in memory plurality of tire air pressure measurements of the actual tire air pressure to indicate if the respective tire has exhibited a slow reduction leak of tire air pressure over the plurality of times.

12. The method of claim 6 wherein the comparison results of the prestored in memory unique vehicle identification to the received unique vehicle identification at the first time are not consistent, the signaling the user a predetermined signal comprises a warning signal.

13. The method of claim 1 further comprising the steps of:
prestoring in the remotely positioned electronic data memory storage device predetermined vehicle tire air pressure acceptable level data for the TPMS sensor;

comparing by the remotely positioned processor one of the stored in memory TPMS sensor first tire air pressure measurement actual tire air pressure or the received TPMS sensor second tire air pressure measurement actual tire air pressure to the prestored in memory vehicle tire air pressure acceptable level data; and signaling a user a predetermined signal based on the remotely positioned processor comparison of the one of the stored in memory TPMS sensor first tire air pressure measurement actual tire air pressure or the received TPMS sensor second tire air pressure measurement actual tire air pressure and the stored in memory vehicle tire air pressure acceptable level data.

14. The method of claim 1 wherein the TPMS sensor on respective of the high volume quantity of transportation vehicles further comprises a TPMS sensor unique identification specific to each TPMS sensor, each respective TPMS sensor operable to transmit the TPMS sensor unique identification on each passage of the respective vehicle through the vehicle inspection station, the method further comprising:

prestoring in the remotely positioned electronic data memory storage device each TPMS sensor unique identification;

receiving by the remotely positioned TPMS tool from each respective TPMS sensor passing through the TPMS tool data communication beam the respective TPMS sensor unique identification as the respective vehicle moves on the vehicle path of travel passing through the vehicle inspection station at the first time;

comparing by the remotely positioned processor the prestored TPMS sensor unique identification to the received TPMS sensor unique identification at the first time; and signaling a user a predetermined signal based on the remotely positioned processor comparison of the prestored in memory TPMS sensor unique identification to the received TPMS sensor unique identification at the first time.

15. The method of claim 14 wherein the step of storing the TPMS sensor first tire air pressure measurement of the actual tire air pressure further comprises storage for a period of time of at least a week operable for historical pressure measurement comparison of the actual tire air pressure for a particular tire.

16. The method of claim 1 wherein sequentially passing of each of the high volume quantity of vehicles comprises passing each vehicle through the vehicle inspection station at a plurality of times, each time subsequent to a previous time, wherein for each passing of a respective vehicle through the vehicle inspection station the remotely positioned TPMS tool thereby receiving a tire air pressure measurement of the actual tire air pressure of the respective tire generating a plurality of tire air pressure measurements of the actual tire air pressure for the respective tire over the plurality of times;

sequentially storing in the remotely positioned electronic data memory storage device the plurality of received tire air pressure measurements of the actual tire air pressure for historical comparison to a last in time passage of the respective vehicle through the vehicle inspection station and received tire air pressure measurement of actual tire air pressure for the respective tire; and comparing by the remotely positioned processor for the respective tire the last in time received tire air pressure measurement of the actual tire air pressure for the respective tire to the stored in memory plurality of tire air pressure measurements of the actual tire air pressure to indicate if the respective tire has exhibited a slow reduction leak of tire air pressure over the plurality of times.

17. The method of claim 16 wherein the storing of the plurality of received tire air pressure measurements of actual tire air pressure further comprises storage for a period of time of at least a week.

18. A method of inspecting one or more vehicle operating conditions of each of a high volume quantity of transportation vehicles, the method comprising:

establishing a vehicle path of travel for a high volume quantity of transportation vehicles to pass through a vehicle inspection station, each vehicle having a first and a second tire pressure monitoring system (TPMS) sensor connected to a respective pneumatic tire and each in communication with an air pressure of the respective tire, each of the first and the second TPMS sensors operable to measure and transmit a respective measurement of actual tire air pressure of the respective tire;

positioning a first TPMS tool adjacent a first side of the vehicle path of travel in the vehicle inspection station, the first TPMS tool projecting a first data communication beam into a portion of the vehicle path of travel;

positioning a second TPMS tool adjacent a second side of the vehicle path of travel in the vehicle inspection station opposite the vehicle path of travel first side, the second TPMS tool projecting a second data communication beam into a portion of the vehicle path of travel exclusive from the first TPMS tool first data communication beam, the first and the second TPMS tools physically unconnected and remotely positioned from the first and the second TPMS sensors;

sequentially passing each of the high volume quantity of transportation vehicles on the vehicle path of travel through the vehicle inspection station, wherein the first and the second TPMS sensors pass through a respective of the first or the second TPMS tool first or the second data communication beam;

the respective first and second TPMS sensors measuring the actual tire air pressure and transmitting the measured actual tire air pressure on each passage of the respective vehicle through the vehicle inspection station;

receiving by each of the respective first and the second TPMS tool, a TPMS sensor first tire air pressure measurement of the actual tire air pressure from respective of the first and the second TPMS sensor as the respective vehicle moves on the vehicle path of travel passing through the vehicle inspection station at a first time;

storing in an electronic data memory storage device the respective first and the second TPMS sensor first tire air pressure measurement of actual tire air pressure, the electronic data memory storage device physically unconnected and remotely positioned from the first and the second TPMS sensor and in data communication with the first and the second TPMS tool;

receiving by each of the respective first and the second TPMS tool, a TPMS sensor second tire air pressure measurement of the actual tire air pressure as the respective vehicle moves on the vehicle path of travel passing through the vehicle inspection station at a second time subsequent to the first time;

storing in the remotely positioned electronic data memory storage device the respective first and the second TPMS sensor second tire air pressure measurements of the actual tire air pressure;

comparing by a processor the stored in memory first TPMS sensor first tire air pressure measurement to the stored in memory first TPMS sensor second tire air pressure measurement and comparing the stored in memory second TPMS sensor first tire air pressure measurement to the stored in memory second TPMS sensor second tire air pressure measurement, the processor physically unconnected and remotely positioned from the first and the second TPMS sensor and in communication with the electronic data memory storage device and the first and the second TPMS tool; and signaling a user a predetermined signal based on the processor comparisons of the respective first and second TPMS sensor first tire air pressure measurements of actual tire air pressure and the TPMS sensor second tire air pressure measurements of actual tire air pressure.

19. The method of claim 18 wherein inspecting one or more vehicle operating conditions further comprises inspecting a unique vehicle identification for each of the high volume quantity of vehicles on each passage of the respective vehicle through the vehicle inspection station, the method further comprising:

prestoring in the remotely positioned electronic data memory storage device the unique vehicle identification for each respective vehicle of the high volume quantity of transportation vehicles having the first and the second TPMS sensor;

receiving by a vehicle identification reader tool positioned adjacent the vehicle inspection station the unique vehicle identification specific to each of the high volume quantity of transportation vehicles having a respective TPMS sensor as each respective vehicle moves on the vehicle path of travel passing through the inspection station at the first time;

comparing by the remotely positioned processor the prestored in memory unique vehicle identification and the received unique vehicle identification specific to each respective vehicle passing through the vehicle inspection station at the first time; and signaling a user a warning signal based on an inconsistency between the compared prestored in memory unique vehicle identification and the received unique vehicle identification at the first time.

20. The method of claim 19 wherein each of the first and the second TPMS sensors on respective of the high volume quantity of transportation vehicles further comprises a TPMS sensor unique identification, each of the first and the second TPMS sensor operable to transmit the respective TPMS sensor unique identification on each passage of the respective vehicle through the vehicle inspection station, the method further comprising:

for each prestored in memory unique vehicle identification, prestoring in the remotely positioned electronic data memory storage device each of the first and the second TPMS sensor respective unique identification for the prestored in memory unique vehicle identification;

receiving by the remotely positioned first and second TPMS tool from each respective first and second TPMS sensor passing through the respective TPMS tool data communication beam the respective first and second TPMS sensor unique identification as the respective vehicle moves on the vehicle path of travel passing through the vehicle inspection station at the first time;

comparing by the remotely positioned processor the prestored first and second TPMS sensor unique respective identifications for the prestored unique vehicle identification to the received first and second TPMS sensor unique identification at the first time; and signaling a user a warning signal based on an inconsistency between the compared prestored in memory unique vehicle identification and first and second TPMS sensor unique identifications to the received first and second TPMS sensor unique identifications at the first time.

\* \* \* \* \*